United States Patent [19]

Krengel et al.

[11] Patent Number: 5,344,062

[45] Date of Patent: Sep. 6, 1994

[54] METHOD OF FORMING SEAMED METAL TUBE

[75] Inventors: Theodore H. Krengel, Flossmoor, Ill.; John J. Borzym, Birmingham, Mich.; Charles A. Willetts, Stourbridge, England

[73] Assignee: The IDOD Trust, Warren, Mich.

[21] Appl. No.: 83,078

[22] Filed: Jun. 24, 1993

[51] Int. Cl.⁵ .................... B23K 101/06; B23K 31/02
[52] U.S. Cl. ................................ 228/147; 228/150; 228/214; 228/231
[58] Field of Search ............... 228/147, 150, 17.5, 228/219, 231, 250, 214; 427/376.8

[56] References Cited

U.S. PATENT DOCUMENTS

| | | | |
|---|---|---|---|
| 1,848,671 | 3/1932 | Sievern | 228/219 |
| 2,575,381 | 11/1951 | Coley | 228/17.5 |
| 2,792,490 | 5/1957 | Risch et al. | 219/137 R |
| 3,350,771 | 11/1967 | Durst | 228/219 |
| 5,035,042 | 7/1991 | Maitra et al. | 228/147 |

FOREIGN PATENT DOCUMENTS 3630625 3/1988 Fed. Rep. of Germany ...... 228/219

*Primary Examiner*—P. Austin Bradley
*Assistant Examiner*—Jeffrey T. Knapp
*Attorney, Agent, or Firm*—Howard & Howard

[57] ABSTRACT

The method of forming a seamed metal tube having a metal coating of this invention includes galvanizing the strip prior to welding. The strip is then formed into an open seam tube and welded in an inert atmosphere with the seam located in the lower portion of the tube. Finally, the metal coating is caused to flow downwardly over the seam, coating the seam by several means. In one embodiment, the strip is preformed into an arcuate shape and galvanized, wherein the zinc coating increases in thickness toward the lateral strip edges, such that the coating will flow over the seam following welding. The tube may also be reheated following welding, preferably in an enclosure containing an inert atmosphere which includes the weld apparatus. In another embodiment, an inert gas is directed over the inner and outer surfaces of the tube, adjacent the seam, driving the molten metal downwardly over the seam to coat the seam. In another embodiment, the lateral edges of the strip are formed with indentions or grooves directed toward the lateral edges which direct the molten metal downwardly over the seam.

32 Claims, 5 Drawing Sheets

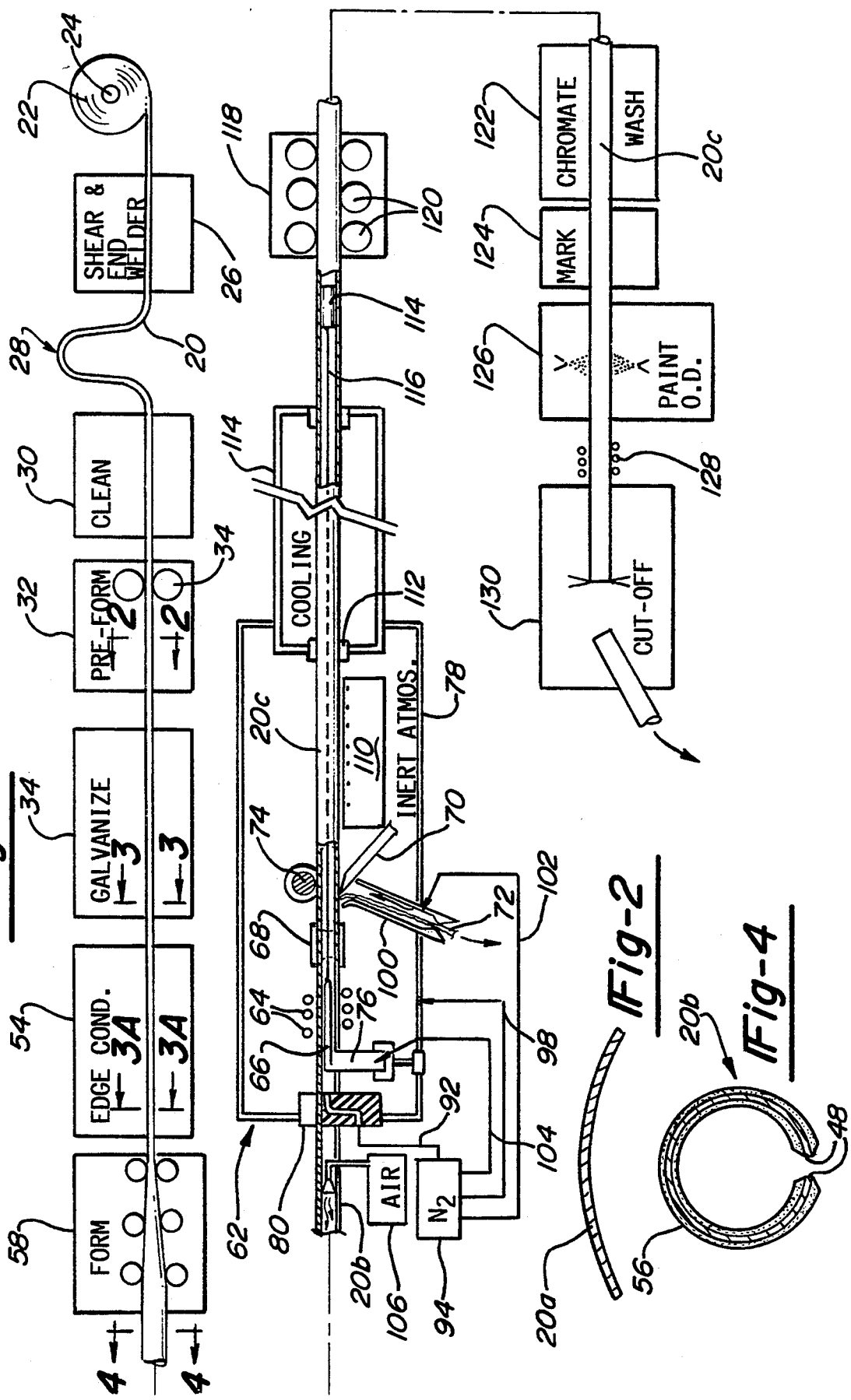

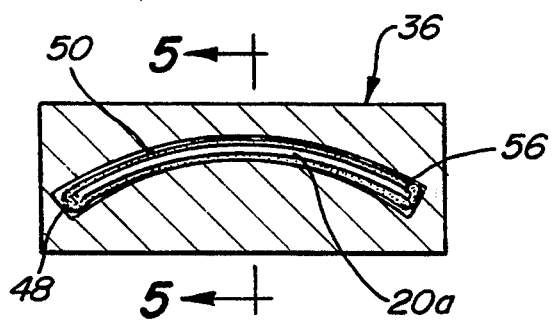
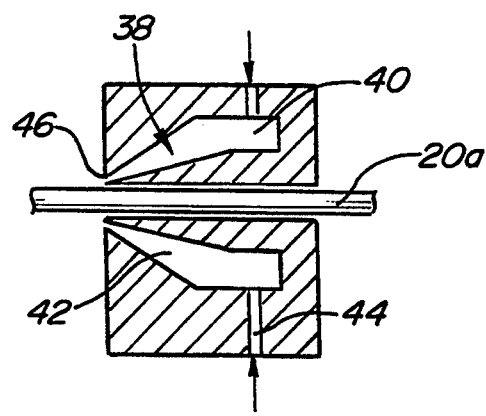
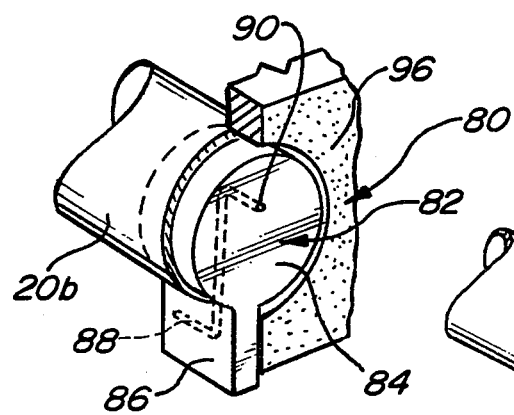
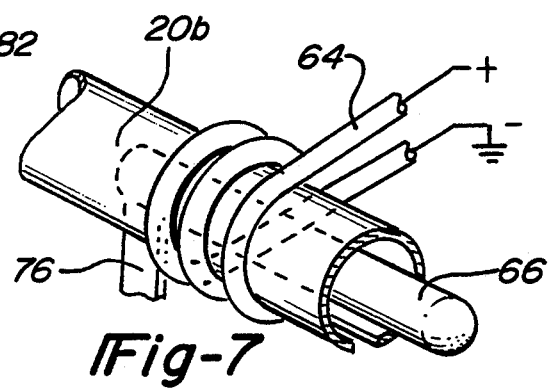
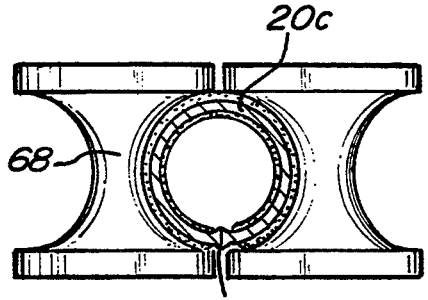
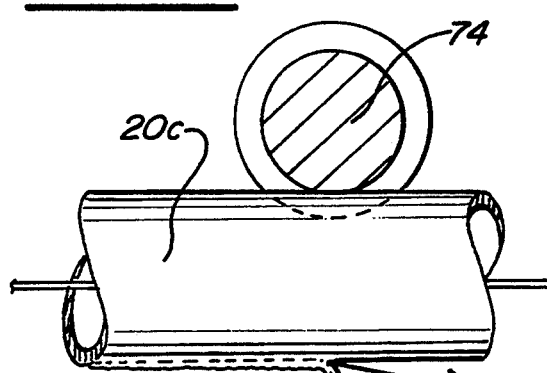
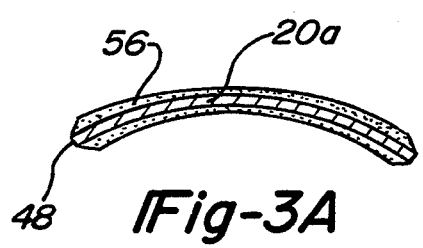
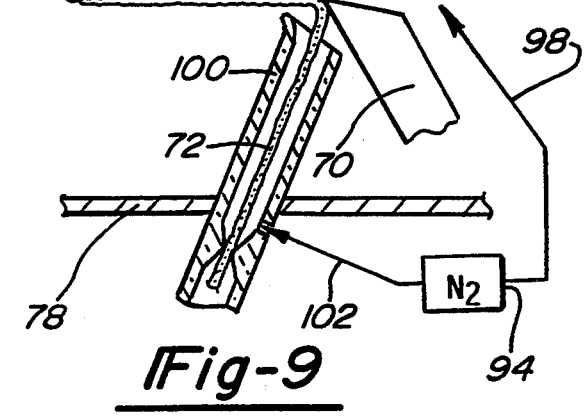

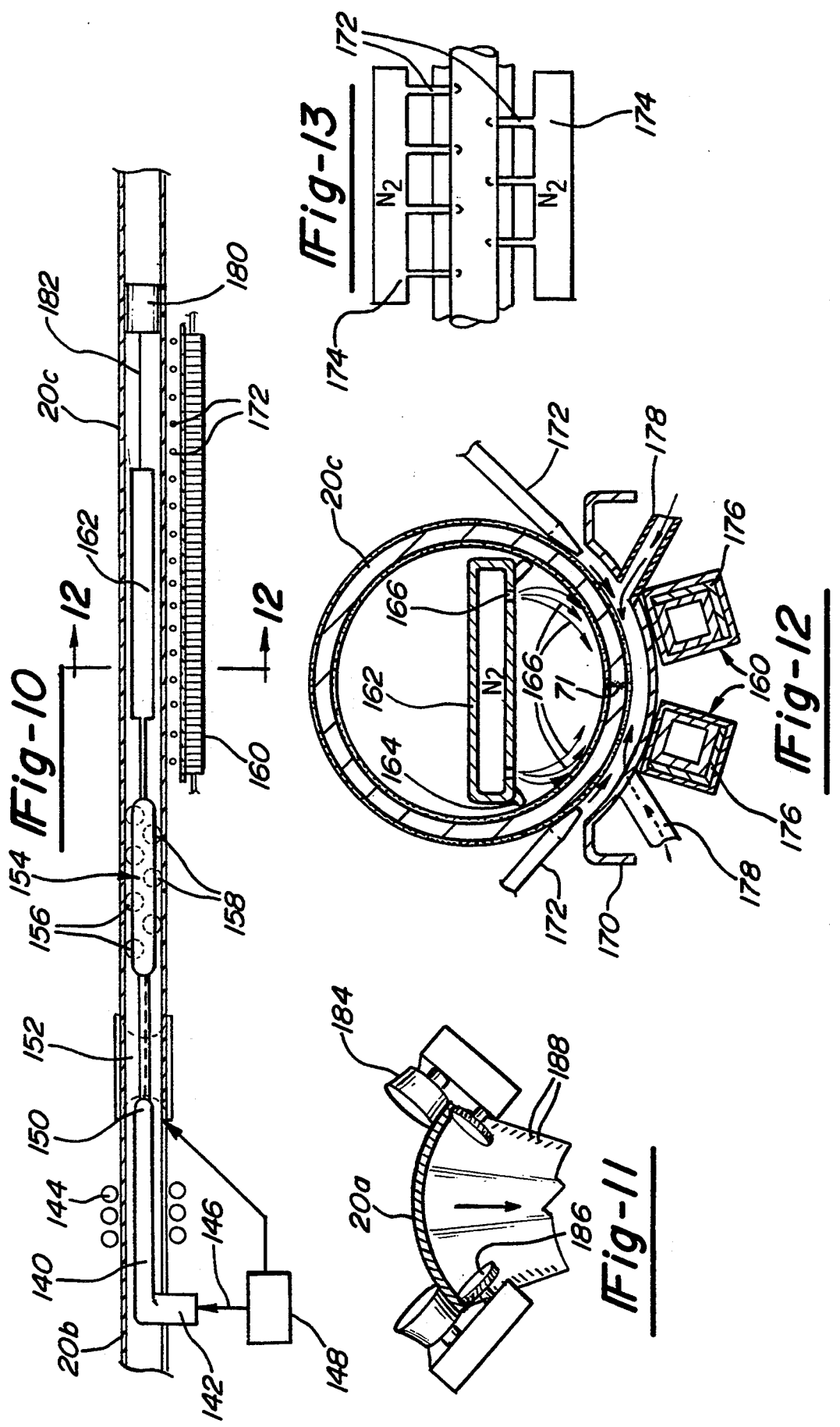

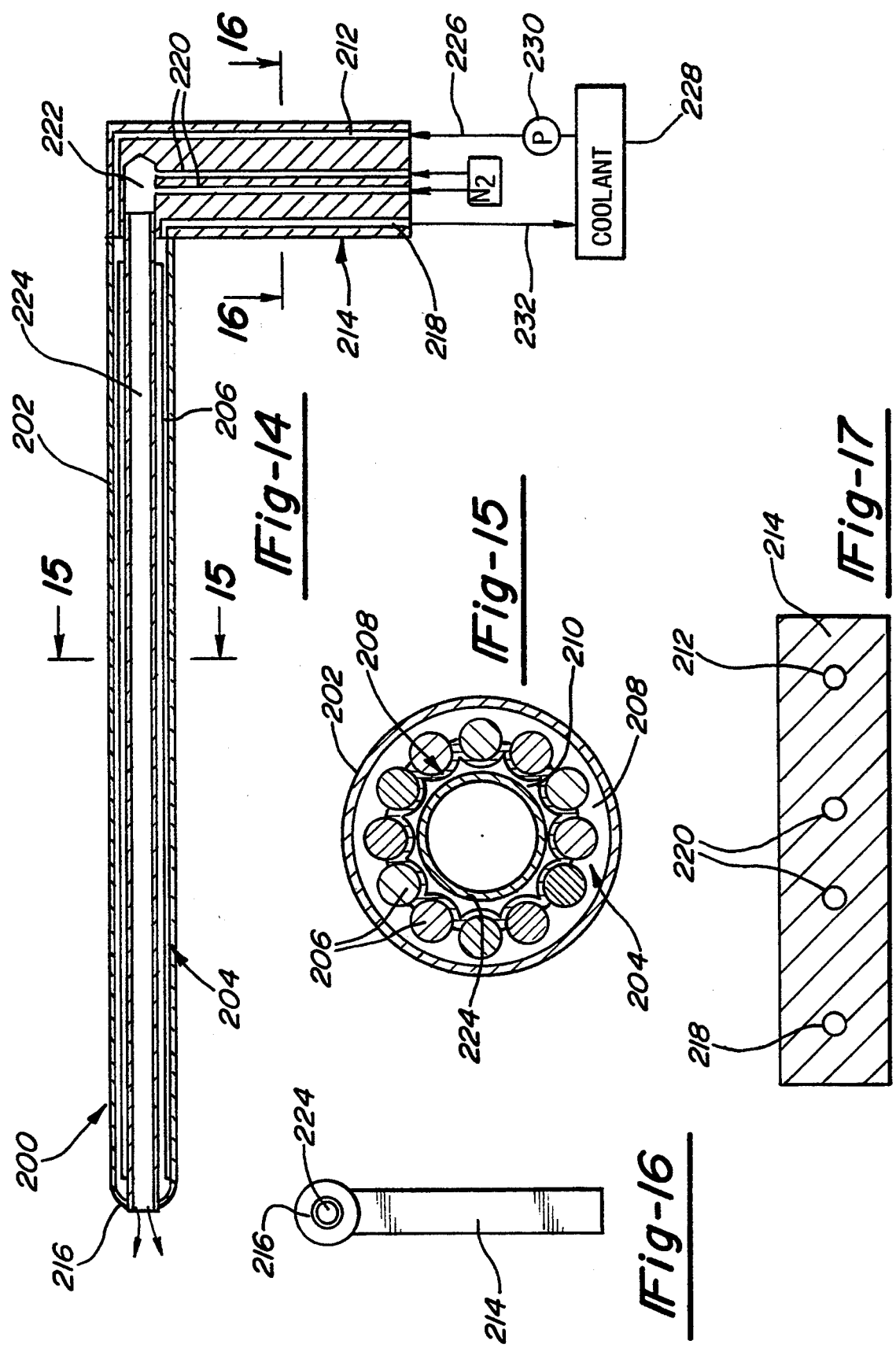

METHOD OF FORMING SEAMED METAL TUBE

This invention relates to an improved method of forming a seamed metal tube having a metal coating. More particularly, the present invention relates to a continuous or in-line process of forming a ferrous metal tube coated with a protective metal coating, preferably, zinc or aluminum.

BACKGROUND OF THE INVENTION

Methods of continuously or in-line forming of a seamed steel tube from a continuous strip or skelp are well known. In a conventional tube forming mill, the continuous strip is first cleaned and conditioned, then rolled to form an open seam tube having nearly abutting edges at the top of the tube. The edges are then welded together by one of several conventional methods which generally include heating the edges and then either forging the edges together with squeeze rolls and/or flux welding the seam. The edges of the tube may be heated, for example by resistance welding, electric arc or by high frequency induction welding. High frequency induction welding is a form of electric resistance welding, wherein the open seam tube is received through an electric work coil which creates a strong magnetic field, which in turn induces a current to flow around the tube and in the "Vee" formed as the edges of the strip are welded. An impeder is generally located within the tube, which forces the current down the nearly abutting edges of the open seam tube, heating the tube edges to a hot forging temperature. The tube edges are then forged by squeeze rolls which drive the molten edges together to form an integral seam.

In-line galvanizing and coating or painting processes are also well known. The strip or skelp may be galvanized or painted on one or both sides prior to forming and welding, or the welded seamed tube may galvanized by immersing the tube in a molten zinc bath. Where the strip is coated with a protective coating prior to seam welding, the coating will burn off or melt in the seam zone because the welding operation involves the melting of the tube material, which is generally steel. Thus, the temperature at the seam may be 2,300° F., or greater. Where the strip is coated with a metal, such as zinc or aluminum, the metal will melt during welding and flow downwardly away from the seam, which is located at the top of the tube. A zinc coating solution has also been used to paint the exterior surface of the seam. However, such coatings have poor adherence and are mainly cosmetic. The failure of the present processes to fully coat and thus protect the tube seam is evident by the fact that the weld area is generally the first to fail in accelerated corrosion tests. At present, there is no commercial in line process coating the entire internal and external surfaces of a tube with zinc. Thus, there has been a long-felt need to provide an improved coating process, particularly on the seam.

The continuous tube forming process and apparatus of this invention solves the above identified problems and produces a superior metal coated tube. The process of this invention assures a fully coated welded seam without substantial additional costs.

SUMMARY OF THE INVENTION

As set forth above, the present invention relates to an improved tube forming and coating process and apparatus. The method of forming a seamed metal tube of this invention is particularly, but not exclusively adapted to a continuous process wherein the strip is coated on one or both surfaces with a metal coating prior to forming and welding. Thus, the method includes first coating one or both surfaces of a metal strip or skelp with a metal coating, preferably a coating of zinc, aluminum or other alloys. The process then includes rolling and forming the strip into a tube-shaped strip or open seam tube having opposed spaced nearly abutting lateral edges in a lower portion of the open seam tube. The process then includes heating and integrally welding the adjacent edges of the strip to form a tube having a welded seam in the lower portion of the tube. The most preferred method includes inductively heating the opposed lateral edges of the strip by moving the strip continuously through an induction coil with the nearly abutting edges oriented generally downwardly and then forging the edges together with squeeze rolls to form an integrally seamed tube having a welded seam oriented downwardly.

The method of this invention may then include reheating at least a lower portion of the tube to the melting temperature of the metal coating, such that the molten metal coating flows downwardly and coats the seam. The metal coating on the inner surface of the tube flows downwardly and accumulates over the seam. In a most preferred embodiment, the open seam tube is welded in a substantially inert atmosphere and the seamed tube is reheated in an inert atmosphere to cause the metal coating to flow downwardly over the seam prior to oxidation of the molten seam. This is accomplished in the disclosed embodiment by enclosing the tube welding and reheating apparatus in an enclosure and injecting nitrogen or other inert gas under pressure into the enclosure to maintain an inert atmosphere. Where the tube is externally coated with a metal coating, the tube seam is preferably scarfed before reheating.

A preferred embodiment of a method of this invention includes coating both surfaces of the strip with zinc, prior to forming. In a most preferred method, the strip is partially formed into an arcuate shape, prior to galvanizing, wherein the thickness of the zinc coating is controlled to form a coating having a thickness which increases from a mid-portion toward the lateral edges of the arcuate strip. It will be understood, however, that the edges should be free of coating to permit welding. Thus, the metal coating is removed from the edges following galvanizing by edge conditioning comprising either slitting the edges or otherwise removing the coating at the edges. Where the thickness of the metal coating increases toward the edges, it is possible to obtain a reflow of the metal coating over the seam, without reheating following welding, particularly where the edges are welded in an inert atmosphere.

Other advantages and meritorious features of the continuous tube forming and coating process of this invention will be more fully understood from the following description the preferred embodiments, the claims, and the drawings, a brief description of which follows.

BRIEF DESCRIPTION OF THE DRAWINGS

FIG. 1 is a schematic flow diagram illustrating a preferred embodiment of the continuous tube forming and coating process of this invention;

FIG. 2 is a cross-sectional view of the strip following preforming in the direction of view arrows 2—2 of FIG. 1;

FIG. 3 is an end view of a gas shaping nozzle at the outlet of the galvanizing tank as shown in FIG. 1, in the direction of view arrows 3—3;

FIG. 3A is an end cross-sectional view of a strip following end conditioning as shown in FIG. 1, in the direction of view arrows 3A—3A;

FIG. 4 is a cross-section view of a tube-shaped strip or open seam tube formed by the process of FIG. 1, in the direction of view arrows 4—4;

FIG. 5 is a side cross-sectional view of the shaping nozzle shown in FIG. 3;

FIG. 6 is a side elevation partially broken away of a tube entering the seam welding station having an internal seal;

FIG. 7 is a side elevation partially cross-sectioned of an induction welding apparatus;

FIG. 8 is an end view of the tube forming step by squeeze rolls;

FIG. 9 is a partially cross-sectioned view of a scarfing apparatus in the inert gas chamber of FIG. 1;

FIG. 10 is a partially schematic, partially cross-sectioned side view of another embodiment of a tube welding and seam coating apparatus which may be used with the process of this invention;

FIG. 11 is an end cross-sectional view of the partially formed strip in an optional edge conditioning apparatus which rolls a pattern on the strip;

FIG. 12 is an end cross-sectional view of the apparatus shown in FIG. 10, in the direction of view arrows 12—12;

FIG. 13 is a top view of a gas assist seam coating apparatus;

FIG. 14 is a side cross-sectional view of an induction welding impeder which may be utilized in the process of this invention;

FIG. 15 is an end cross-sectional view of the impeder shown in FIG. 14, in the direction of view arrows 14—14;

FIG. 16 is an end view of the impeder shown in FIG. 14;

FIG. 17 is an end cross-sectional view of the impeder shown in FIG. 14 in the direction of view arrows 16—16;

Figure 18:
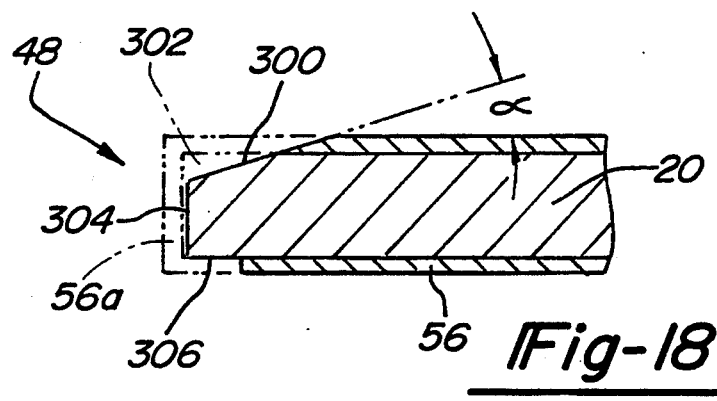
FIG. 18 is a partial end cross-sectional view of one lateral edge of the strip following edge conditioning.

DESCRIPTION OF THE PREFERRED EMBODIMENTS OF THE TUBE FORMING AND COATING PROCESS OF THIS INVENTION

As shown in the schematic flow diagram of FIG. 1 and described above, the tube forming and coating and process of this invention is particularly, but not exclusively adapted for processing of endless lengths of untreated strip steel or skelp, such is normally processed by a continuous tube forming mill. Improvements described herein can also, however, be used with pre-coated strip, wherein a metal coating is applied to one or both surfaces of the strip prior to processing. Further, the improvements described herein can also be used in a batch or non-continuous process. The process of this invention will, however, be described in relation to the continuous process disclosed in FIG. 1.

Metal strip or skelp, preferably strip steel, 20 is supplied to the tube forming mill in coils 22, which are mounted on a pay-out reel 24. The coil is mounted for free rotation on the reel 24 as required by an continuous tube forming mill. As will be understood by those skilled in the art, the strip is processed by the mill substantially continuously at a constant rate. The advancement of the flat strip or skelp 20 through the mill is effected primarily by engagement between the strip and the forming and sizing rolls which rotate at a relatively constant speed. The strip 20 is thus drawn into the mill from the pay-out reel 24.

Because the length of each coil 22 of strip steel is taken up by the mill in a relatively short time, means must be provided for splicing the end of one coil to the next, which is accomplished at the splicing station 26. In the splicing station 26, the end of the coil being processed in the mill is sheared or cut to provide a square end and the end is then welded to the beginning of the next reel. A conventional accumulator 28 in the form of a loop of strip is provided having sufficient length to continuously feed the strip to the mill while the trailing end of the coil is held stationary for shearing and welding. The loop may be formed by feeding the strip over a series of rolls (not shown) which are mounted to freely rotate as is well-known in the art. When the splice is complete, the strip is again paid-out over the accumulator rolls for the next splicing operation when the next reel is exhausted.

Because the coil of skelp is received by the mill normally includes oil and may include other contaminants, it is generally necessary to clean and prepare the strip prior to coating, which in the disclosed process is accomplished at the cleaning station 30. In a typical application, the strip is cleaned and prepared by alternate alkaline and phosphate washes, with intermediate thorough water rinses. In the disclosed process, the strip is also dried. The cleaned strip is now ready for galvanizing.

In one preferred embodiment of the process of this invention, the strip is then advanced to a preform station 32, having a plurality of rolls 34 which form the strip into an arcuate shape as shown at 20a in FIG. 2. As described, for example, in U.S. Pat. No. 3,696,503 of Krengle et al, the strip is formed by a series of forming rolls which have a configuration and number sufficient to form the strip into an arcuate shape, including rolls which engage the upper surface of the strip having a slightly convex shape and lower rolls which have a slightly concave shape to begin the deformation of the strip into the desired shape. The strip is then formed by a series of opposed rolls, each having a greater radius of curvature than the prior rolls until the strip is formed into the preferred arcuate shape 20a of FIG. 2. By forming the strip in the manner shown in FIG. 2, the amount of zinc which will adhere to the surface will be that necessary to obtain a coating that will be strongly bonded to the surface of the strip having a desired thickness, good coverage and a good appearance.

The arcuate shaped strip 20a is then advanced through the galvanizing tank 34 and immersed in molten zinc in a convention manner as described, for example, in the above-referenced U.S. patent of Krengel, et al. The zinc coating on the arcuately shaped strip flows downwardly toward the lateral edges of the strip, such that the thickness of the zinc coating increases from the mid-portion toward the edges. In a most preferred method of this invention, the zinc coating is further shaped by an inert gas shaping nozzle 36 located adjacent the outlet of the galvanizing tank. A suitable embodiment of a gas shaping nozzle 36 is shown in FIGS. 3 and 5. As shown, the nozzle includes an axial and radially extending gas chamber 38, including a generally cylindrical inlet portion 40 and a conical portion 42 defined by converging conical walls. A gas, such as nitrogen, is introduced under pressure through inlet ports 44 into the inlet 40 of the gas nozzle. The gas accelerates through the outlet portion 38 and exits the restricted openings 46 above and below the arcuately shaped strip 20a. As shown in FIG. 3, the exit opening 46 adjacent the mid portion of the strip 20a is narrower than the opening adjacent the lateral edges 48 of the strip. The liquid zinc is thus directed and driven outwardly and downwardly toward the lateral edges 48, shaping the zinc coating on the strip, such that the thickness of the coating increases from the mid portion toward the lateral edges 48. Baffles 50 may be employed to control the velocity of the gas exiting the nozzle at locations along the width of the strip. As described below, the purpose of shaping the zinc coating on the strip is to assure that there is sufficient volume of coating to reflow over the seam following welding, coating and protecting the seam. The requirement for shaping the coating disclosed herein will depend upon several factors, including the speed of the line, the thickness of the zinc coating, the temperature of the strip leaving the galvanizing bath, the shape of the strip, etc. As will be understood by those skilled in the art, shaping the coating as described herein will reduce the overall thickness of the coating; however, it may not be required to preform the strip or shape the coating in all applications, particularly where a thicker metal coating is used. Further, it is possible to shape the coating with the gas shaping nozzle of this invention without preforming the strip into an arcuate shape.

In a conventional mill, the strip 20 as received on the reel has a width which is slightly greater than the width required to form the tube, such that an edge is available on each side of the strip for proper sizing of the tube and to provide freshly cut metal at the abutting edges forming the seam. The side edges of the strip will be coated with zinc in the galvanizing tank 34. Thus, it is preferable to remove the zinc from the side edges prior to welding, particularly where the edges of the open seam tube are joined by induction welding. A conventional edge shaver or slitter may be used in the edge conditioning station 54, which may be used to cut a square edge. More preferably, a chamfered edge is provided to provide relief for the forged upset and assure good welding contact between the edges in the welding operation described below. FIG. 3a illustrates the strip following edge conditioning, wherein the zinc coating has been removed from the lateral edges 48 of the arcuate strip and the zinc coating 56 increases in thickness from the mid-portion toward the lateral edges 48.

The arcuate metal strip 20a is then rolled into a tube-shaped strip or open seam tube 20b having adjacent or nearly abutting or lateral edges at the forming station 58. The metal strip is progressively formed into an open seam tube as it passes between rolls 60. The rolls are rotatively supported on vertical and horizontal axles (not shown) in a conventional manner. However, in the continuous tube forming and coating process of this invention, the lateral edges of the strip are deformed or bent downwardly and inwardly toward one another as the tube is formed, rather than upwardly as in a conventional tube forming mill. The lateral edges of the strip are then rolled into nearly abutting relation at the lower portion of the open seam tube 20b; however, the adjacent lateral edges are slightly spaced, as shown in FIG. 4. The open seam tube 20b is then received in the tube welding station 62, where the lateral edges of the strip are welded, as now described.

The preferred embodiment of the tube welding apparatus of this invention utilizes high frequency induction to heat the opposed lateral edges of the open seam tube 20b. As shown in FIGS. 1 and 7, the induction welding apparatus includes a work coil 64 which is connected to a source of high frequency alternating current. The work coil 64 creates a strong magnetic field, which in turn induces current in the open seam tube adjacent the work coil. An impeder 66 is located within the open seam tube 20b. The impeder 66 includes a support or bracket portion 76 which extends downwardly between the opposed adjacent lateral edges 48 of the open seam tube 20b. A conventional induction welding impeder consists of a non-metallic tube surrounding one or more ferrite rods. Water or mill coolant is circulated over and past the ferrite rods to remove the heat produced by magnetic hysteresis and eddy current losses. At the frequencies used for induction welding (200 to 800 kHz), current flows around the tube and along the "Vee" formed by the approaching edges of the strip, heating the edges to a hot forging temperature, whereby the edges are at least partially melted. The edges are then forged together by squeeze rolls 68 as shown in FIG. 8, forming an integral seam 71. Where the strip is steel, the temperature of the edges will be about 2,300° F., or greater. The seamed tube then passes over a scarfing tool 70 which removes the flash 72 from the outer portion of the seam, as shown in FIGS. 1 and 9. A back-up roller 74 engages the opposed surface of the tube, counteracting the pressure of the scarfing tool 70.

In the preferred tube welding and coating process of this invention, the edges of the open seamed tube are welded in a substantially inert atmosphere. In the embodiment of the tube welding station 62 shown in FIG. 1, the welding apparatus is enclosed within an enclosure 78. The open seam tube 20b is received in the enclosure through an inert gas seal 80 best shown in FIG. 6. The inert gas seal includes an inner plug 82 which may be formed of a friction resistant thermoset plastic or a ceramic, such as reinforced nylon, which receives the open seam tube 20b, as shown in FIG. 6. The body portion 84 of the plug is generally cylindrical having an outside diameter which is nearly equal to the inside diameter of the open seam tube, to be closely received within the tube. The plug 82 includes a relatively thin radial support portion 86 which is received between the edges of the open seam tube. A gas port extends through the support portion 86 into the plug body portion 84 having an outlet 90 which injects an inert gas, preferably nitrogen, into the open seam tube. Line 92 (see FIG. 1) connects a source of inert gas 94 to the inlet in the support portion 86 of the gas plug. A fiber, ceramic or plastic outer seal 96 closely receives the outer surface of the open seam tube 20b, providing a seal for the open seam tube as it enters the inert atmosphere in the enclosure 78. Nitrogen gas is also injected through line 98 into the enclosure 78 to produce a substantially inert atmosphere in the enclosure. The flash 72 scarfed from the tube is received in a tube 100 which extends out of the enclosure 78 as shown in FIG. 9. Inert gas is injected into the tube through line 102 to maintain the inert atmosphere in the enclosure 78 as the flash is scarfed from the tube. Finally, as described more fully hereinbelow, inert gas is also injected into the impeder through line 104, which is connected to the bracket 76 of the impeder. In the disclosed embodiment, the tube is dried and cleaned prior to receipt in the inert atmosphere enclosure 78 by an air blower 106 which blasts warm air into the open seam tube 20b. The blower dries the tube and blows small debris out of the tube through the spaced lateral edges 48.

As described above, the metal coating on the tube will melt or burn off in the weld zone by the forging temperature induced by the work coil 64. Further, the weld seam is relatively rough and therefore difficult to coat. Where the tube is galvanized after welding, the zinc coating will tend to pull away from the seam as the tube emerges from the zinc bath because the seam is normally located at the top of the tube. In the tube welding and coating process of the present invention, however, the nearly abutting edges 48 are located near the bottom of the tube as shown in FIG. 4, such that the zinc melted by the welding process will flow downwardly over the seam, re-coating the seam with molten zinc. Where the thickness of the zinc coating is built up adjacent the seam, the zinc melted in the welding process may be sufficient to fully re-coat the seam without reheating, depending upon the thickness of the coating, the diameter of the tube and the speed of the line. In other applications, however, it will be necessary to remelt the metal coating to cause the metal coating to flow downwardly over the seam. Thus, the tube welding apparatus 62 in FIG. 1 includes an induction coil 110 which "reheats" at least a lower portion of the seamed tube 20c, melting the zinc at least adjacent the seam. Because the seam is located in the lower portion of the tube, the molten zinc then flows downwardly over the inner and outer surfaces of the seam and collects at the bottom of the tube, coating the seam 70 with a protective zinc coating as disclosed herein.

As used herein, reheating may comprise maintaining the temperature of the welded tube 20c or supplemental heating a lower portion of the tube to a temperature above the melting temperature of the metal coating which is preferably zinc. The open seam tube 20b may also be heated prior to forging by an induction coil without an impeder. This is a less efficient means of heating the lateral edges 48 of the open seamed tube, but will result in heating the lower portion of the tube spaced from the lateral edges to a temperature above the melting temperature of the metal coating. Depending upon the diameter of the tube and the speed of the line, no further heating may be required to cause the metal coating to flow over the seam. Alternatively, the welding temperature may be maintained by a parallel induction coil as shown, for example, at 160 in FIG. 10. The seam, however, may be located anywhere in the lower half of the tube, provided the induction coil 110 is located adjacent the seam. More preferably, the seam is located a lower third of the tube. The seamed tube 20c then exits the inert atmosphere chamber 78 through seal 112, which may be a inert gas seal as described herein.

The tube is then cooled by immersing the tube in cold water or other coolant in the cooling chamber 114, freezing the metal coating on the tube. Inert gas is prevented from escaping the tube in the welding apparatus 62 by a cylindrical plug 114 which may be attached to the end of the impeder by a tether 116. The plug 114 may be made of a friction resistant thermoset plastic, such as nylon, and is preferably located sufficiently downstream from the conduction coil 110 and following cooling to avoid damage to the plug.

Following cooling, the tube 20c enters the final sizing station 118 which includes a plurality of sizing and straightening rolls 120. Thereafter, the tube is flooded with an aqueous chromate solution and rinsed at 122, which cleans the tube prior to final finishing. In a conventional tube mill, the tube is then marked at 124 with product identification and further markings as may be specified by the customer. A clear lacquer coat or other protective coating may then be applied in the OD paint station 126. An induction heating coil 128 may then be used to dry the tube and the tube is finally cut to length at the cut-off station 130.

FIGS. 10, 12 and 13 illustrate an alternative embodiment for the induction welding apparatus which may be used to further improve the re-coating of the welded seam. Although not shown, it would be understood that the induction welding apparatus is preferably enclosed in an inert atmosphere, as disclosed above in regard to FIG. 1. The inert atmosphere in and around the tube reduces oxidation of the seam and thus improves the metal coating. An impeder 140 is located within the open seam tube 20b having a bracket portion 142 which extends downwardly between the adjacent edges of the strip, as described above. An inert gas, preferably nitrogen, is fed through line 146 to the bracket portion 142 of the impeder from a source of non-oxidizing gas under pressure 148. As described below in regard to FIGS. 13-16, the nitrogen gas is transmitted through the impeder 140 to the free end of 150 of the impeder where it exits the impeder and floods the weld zone where the molten edges of the open seam tube are forged and welded together by squeeze rolls 152. In the disclosed embodiment, the inner surface of the seam is rolled, smoothed and flattened by roller assembly 154. Roller assembly includes upper and lower cylindrical rolls 156 and 158, respectively, which are biased against the upper and lower surfaces of the tube to roll and flatten the inner surface of the seam 70.

The seamed tube 20c is then reheated to the melting temperature of the metal coating by induction coil 160. As described above, the induction coil 160 is located adjacent the seam and heats the tube to a temperature sufficient to melt the metal coating, causing the metal coating flow downwardly over the inner and outer surfaces of the seam and coating the seam. In the most preferred embodiment where the tube is galvanized, the tube adjacent the seam is heated to at least 420° C. In the embodiment of the apparatus shown in FIGS. 10, 12 and 13, an inert gas, preferably nitrogen, is also directed over the tube 20c toward the seam, driving and directing molten metal downwardly over the seam. A nitrogen manifold 162 is supported within the tube on rollers or wheels 164 as best shown in FIG. 12. The manifold 162 includes a plurality of generally downwardly directed openings 166 which direct nitrogen gas under pressure downwardly toward the seam 70 as shown by arrows 166. As further shown in FIG. 12, the induction coil 160 is located below apron 170 which protects the induction coil and guides inert gas over the external surface of the tube. In the disclosed embodiment, a plurality of staggered generally downwardly projecting nozzles are connected to nitrogen manifold tubes 174, as shown in FIG. 13. The nozzles may preferably be staggered to avoid opposed streams of gas; however, the nozzles may also be opposed. In the disclosed embodiment, the induction coil 160 is located in apron 170 which further includes staggered ports 178 which direct the inert gas upwardly against the lower surface of the tube, forming a sheet of inert gas which drives molten zinc downwardly over the exterior surface of the welded seam 70. As described above, this apparatus is preferably enclosed within an enclosure which is filled with nitrogen gas, preventing oxidation of the weld and the molten zinc, assuring a good adhering coating over the weld. A cylindrical plug 180 is connected by tether 182 to the following end of the manifold 162. The plug 180 limits the escape of nitrogen gas to maintain the inner surface of the tube in an inert atmosphere.

FIG. 11 illustrates a further means of directing the flow of molten zinc to the welded seam. As shown in FIG. 11, the arcuate strip 20a is received between rollers 184 and 186. The inner roller 186 includes a herring bone pattern which imparts a herring bone pattern 188 to the inner surface of the strip on opposite sides of the seam. The rollers 184 and 186 may be located at the beginning of the forming station 58 or in the edge conditioning station 54. When the tube is rolled into an open seam tube 20b as shown in FIG. 4, the herring bone pattern will be located adjacent the inner edges 48 of the open seam tube. The herring bone pattern will thus direct the molten zinc toward the seam, improving the flow of zinc over the seam.

FIGS. 14–17 illustrate a preferred embodiment of an impeder 200 which may be utilized with the tube forming and coating process of this invention. The impeder 200 includes an outer casing 202 formed of a nonmetallic, nonconductive magnetically permeable material. Inside the outer shell 202 is a first outer annular chamber 204 which contains ferrite rods 206 as best shown in FIG. 15. The ferrite rods 206 are preferably located in close proximity to the outer casing 202. In the disclosed embodiment of the impeder, the ferrite rods 206 are arranged in a ring and radially spaced adjacent the shell 202. The ferrite rods are supported in a cradle 208 formed of a nonconductive metallic material. As shown in FIG. 15, the cradle, which may be formed of a heat resistant thermoset plastic, further divides the outer chamber 204 into an outer portion 208 and an inner portion 210. Liquid coolant, which may be water or a light oil, is circulated around the ferrite rods by injecting the coolant under pressure into one port 212 in the bracket or support portion 214 into the outer chamber 208. The coolant then circulates through the free end 216 of the casing, where it returns through the inner portion 210 of the chamber 204 and out the outlet port 218 in the bracket or support portion 214. Coolant removes heat from the ferrite rods which are heated during the induction welding of the tube. An inert gas, preferably nitrogen, is injected under pressure into the inner ports 220 in the bracket portion. The inert gas is then received in chamber 220 at the end of tube 224. The axial tube 224 extends through the free end 216 of the shell 202 and floods the inside of the tube with inert gas, as described above. The coolant inlet port 212 is connected by line 226 to a coolant tank 228. A conventional pump 230 pumps the coolant through the impeder, as described. A return line 232 returns the coolant to tank 228.

FIG. 18 illustrates one preferred embodiment of a lateral edge 48 of the strip 20 following edge conditioning at station 54 in FIG. 1. As shown, the metal coating 56, which is preferably zinc, has been removed from the edges 48 as shown in phantom to expose the edges of the metal strip 20, which is preferably steel. In the preferred embodiment of the lateral edge 48 shown in FIG. 18, the inner edge 300 is preferably cut at an angle alpha, as shown, removing a triangular portion 302 of the metal strip and the zinc coating 56A. The end or edge 304 is cut square to the strip and the outer surface 306 is exposed, as shown. As used herein, "inner" refers to the surface of the strip which forms the inner surface of the tube and "outer" refers to the surface of the strip which forms the outer surface of the tube.

In the disclosed embodiments, the metal coating covering the inner and outer surfaces of the strip 20 is preferably removed to expose or bare the steel strip adjacent the edges 304, such that less of the metal coating 56 is burned-off or vaporized during welding. The ends 304 are preferably square and exposed to assure a good weld. Finally, the inner surfaces 300 adjacent the ends 304 are preferably formed to define an inner concave depression or well in the tube which receives the metal coating as the molten coating metal flows downwardly over the weld or seam inside the tube, as described below. As described above, the strip 20 may be flat or preformed into an arcuate shape 20a as shown in FIG. 2.

Figure 19:
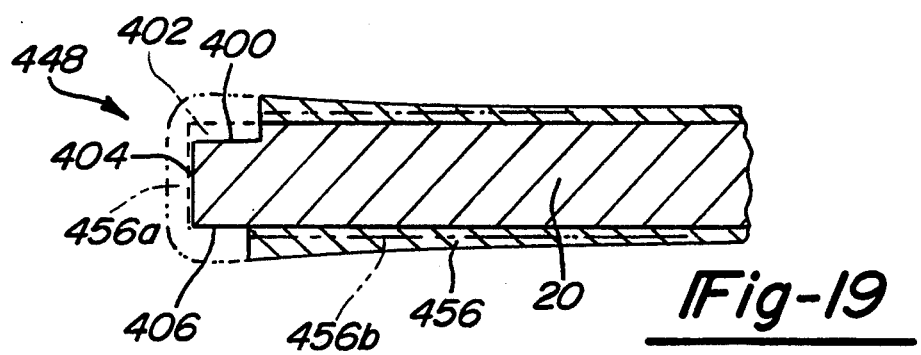
FIG. 19 is a partial end cross-sectional view of a second embodiment of the lateral edge of the strip following edge conditioning.

FIG. 19 illustrates an alternative preferred embodiment of the lateral edge 448 of the strip 20. As described above in regard to FIG. 18, the metal coating 456A covering the inner and outer surfaces of the strip 20 are preferably removed to bare the steel strip adjacent the ends 404, such that less of the coating 456 is burned-off or vaporized during welding. In the embodiment shown in FIG. 19, however, the metal coating 456 increases in thickness toward the edges 448, which is shown somewhat exaggerated in FIG. 19. As described above, this provides more coating metal to reflow over the welded seam in the process of this invention. The desired overall thickness of the metal coating is shown in phantom at 456B. A portion 402 is removed from the steel strip at the edge conditioning station 54 (FIG. 1), such that the exposed surface 400 forms a well or concave depression adjacent the welded seam which receives molten coating metal as described above. The ends 404 are preferably relatively flat and generally transverse to the inner and outer side surfaces of the strip 20 to assure a good weld and the outer surface 406 is exposed to limit vaporization of the metal coating as described above.

Figure 20:
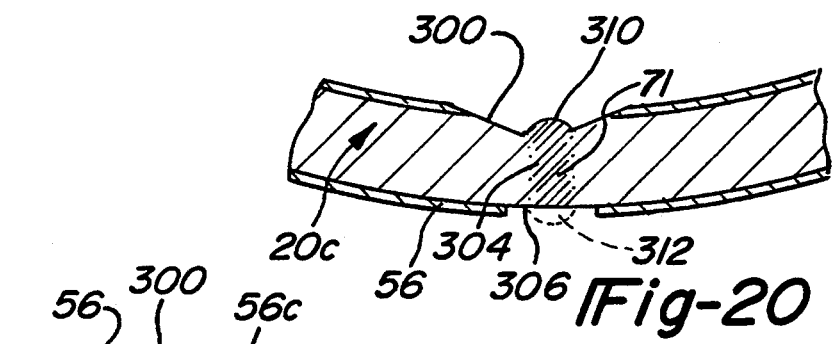
FIG. 20 is a partial end cross-sectional view of a seamed tube formed from a strip which was edge conditioned as shown in FIG. 18.

FIG. 20 illustrates the tube 20c adjacent the seam 71 following welding. The embodiment of the seamed tube 20c shown in FIG. 20 was formed from a strip having chamfered or inwardly angled surfaces 300 adjacent the welded seam 71 as described above in regard to FIG. 20. As will be understood by those skilled in the art, the forging of the molten edges 304 by the squeeze rolls 68 (see FIGS. 1 and 8) results in upset flashes on the inner and outer surfaces of the tube. The outer flash 312 is removed by a scarfing tool 70; however, the inside flash 310 cannot be scarfed or removed by conventional means. As described above, the height of the inside flash 310 can be reduced by chamfering the inside surface adjacent the lateral edge as shown at 300 in FIG. 18 or by providing a reduced thickness portion as shown at 400 in FIG. 19. Further, the chamfered surface 300 guides the molten metal of the coating 56 downwardly to the upset portion 310 of the seam 71 and provides a well receiving the molten metal.

Figure 21:
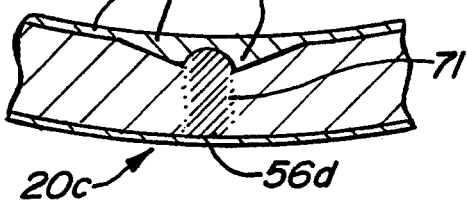
FIG. 21 is a partial end cross-sectional view of the seamed tube shown in FIG. 20 following reflow of the metal coating over the seam.

FIG. 21 is a cross-sectioned end view of a portion of the tube 20c following reflow of the metal coating, preferably zinc, over the welded seam 71. As shown, the coating 56 flows downwardly over the opposed inwardly inclined surfaces 300 on the inside of the tube and accumulates in the recess or well coating the seam, as shown at 56C in FIG. 21. Similarly, the zinc coating flows downwardly over the outside surface of the tube coating the outer surface of the seam, as shown at 56D. If a herring bone pattern is formed on the inner surface of the tube, as described above in regard to FIG. 11, the herring bone pattern should be applied on the chamfered surface 300 after edge conditioning. As described above, the tube may be reheated above the melting temperature of the zinc or other metal coating to cause the coating to flow downwardly over the seam as shown in FIG. 21 and the molten metal may be driven downwardly by inert gas pressure as shown, for example, at FIG. 12.

As will now be understood, the forming and welding of the tube upside-down following galvanizing with the seam located in the bottom of the tube provides for the coating of the inner and outer surfaces of the seam without acquiring special coating equipment. There are disclosed herein several means for driving and directing the flow of molten zinc over the seam, including reheating the tube, driving the molten zinc with an inert gas and forming flow paths in the base metal. These means can be used alone or in combination, as required by the parameters of the particular application, including tube size, mill speed, tube and coating material, welding temperature, etc. Further, various modifications may be made to the tube forming and coating process and apparatus of this invention within the purview of the appended claims. Further, mix patterns may be applied to the inner and outer surfaces of the tube adjacent the seam to direct the flow of molten metal into the seam in addition to or instead of the herring bone pattern shown in FIG. 11. Further, the internal gas manifold 162 of FIG. 12 may be used without the external gas system shown in FIG. 12. The tube may also be reheated by any suitable heating means, including radiant heaters. Finally, the tube may be welded by other conventional means, including, for example, resistance or flux welding.

We claim:

1. A method of forming a seamed metal tube having a metal coating from a continuously moving relatively flat metal strip, comprising the following steps performed in sequence:
   a) applying a coating to at least one side surface of said strip with a metal coating selected from the group consisting of zinc, aluminum and their alloys;
   b) rolling and forming said strip into a tube-shaped strip having opposed adjacent spaced lateral edges in a lower portion of said tube-shaped strip;
   c) heating and integrally welding said adjacent edges of said strip to form a tube having a welded seam in said lower portion of said tube; and
   d) reheating at least said lower portion of said tube to the melting temperature of said metal coating, said metal coating then flowing downwardly over and coating said seam.

2. The method of forming a coated seamed tube as defined in claim 1, wherein said method includes coating said strip with a metal coating having a thickness which increases from a mid-portion toward said lateral edges.

3. The method of forming a coated seamed tube as defined in claim 1, wherein said method includes welding said tube edges and reheating said tube in a non-oxidizing atmosphere.

4. The method of forming a coated seamed tube as defined in claim 3, wherein said method includes heating and welding said edges of said tube-shaped strip and reheating said tube in an enclosure, said method further including continuously introducing an inert gas under pressure into said enclosure maintaining said non-oxidizing atmosphere.

5. The method of forming a coated seamed tube as defined in claim 4, wherein said method includes cooling said tube following reheating.

6. A method of forming a seamed metal tube having a metal coating from a metal strip, comprising the following steps performed in sequence:
   a) coating said strip with a metal coating spaced from the lateral edges of said strip;
   b) rolling and forming said strip into a tube-shaped strip having opposed adjacent spaced lateral edges;
   c) inductively heating at least said opposed lateral edges of said strip by moving said strip continuously through an induction heating coil with said opposed adjacent spaced lateral edges oriented generally downwardly and forging said edges together to continuously form an integrally seamed tube having a welded seam oriented generally downwardly; and
   d) reheating at least said lower portion of said tube to the melting temperature of said metal coating, said metal coating then flowing downwardly over and coating said seam.

7. The method of forming a coated seamed tube as defined in claim 6, wherein said method includes coating said strip with a metal coating which increases in thickness from a mid-portion toward said lateral edges;

8. The method of forming a coated seamed tube as defined in claim 6, wherein said method includes inductively heating and forging said tube lateral edges and reheating said tube in a non-oxidizing atmosphere.

9. The method of forming a coated seamed tube as defined in claim 8, wherein said method includes inductively heating and forging said edges of said tube-shaped strip and reheating said tube in an enclosure, said method further including continuously introducing nitrogen gas under pressure into said enclosure maintaining said non-oxidizing atmosphere.

10. A method of forming a seamed metal tube having an internal and external metal coating from a continuously moving relatively flat metal strip, comprising the following steps performed in sequence:
   a) applying a coating to at least one side surface of said strip with a metal coating;
   b) continuously rolling and forming said strip into a tube-shaped strip having opposed adjacent spaced lateral edges in a lower portion of said tube-shaped strip;
   c) heating and continuously forging said opposed adjacent spaced lateral edges of said tube-shaped strip in a sealed enclosure to form a tube having a welded seam in said lower portion of said tube; and d) introducing an inert gas under pressure into said enclosure forming a non-oxidizing atmosphere in said enclosure with the temperature of said tube adjacent to and including said seam above the melting temperature of said metal coating and said metal coating flowing downwardly and coating said seam following forging.

11. The method of forming a seamed metal tube as defined in claim 10, wherein said method includes directing a jet of inert gas under pressure over a surface of said tube toward said seam forging of said edges, said inert gas directing said flow of molten metal coating over and coating said seam.

12. The method of forming a seamed metal tube as defined in claim 10, wherein said method includes directing a plurality of jets of inert gas under pressure over an inner surface of said tube, adjacent said seam generally towards said seam, wherein said step of directing said plurality of jets over an inner surface of said tube follows forging of said tube lateral edges, said inert gas jet directing said flow of molten metal coating over and coating said internal seam.

13. The method of forming a seamed metal tube as defined in claim 10, wherein said method includes reheating at least said lower portion of said tube to above the melting temperature of said metal coating within said enclosure, said metal coating then flowing downwardly over and coating said seam.

14. The method of forming a seamed metal tube as defined in claim 13, wherein said method includes cooling said tube following reheating.

15. The method of forming a seamed metal tube as defined in claim 13, wherein said method includes directing a jet of inert gas under pressure over a surface of said tube towards said seam following reheating of said tube, said inert gas jet directing said flow of molten metal coating over and coating said seam.

16. The method of forming a seamed metal tube as defined in claim 13, wherein said method includes directing a plurality of jets of inert gas under pressure over an internal surface of said tube adjacent said seam and towards said seam following reheating, said inert gas jet directing said flow of molten metal coating over and coating said seam inner surface.

17. The method of forming a seamed metal tube as defined in claim 13, wherein said method includes scarfing said seam within said enclosure before reheating.

18. The method of forming a seamed metal tube as defined in claim 17, wherein said method includes scarfing said seam with a scarfing knife located in a tube extending out of said enclosure and said method including introducing nitrogen under pressure into said tube.

19. A method of forming a seamed metal tube having a protective metal coating from a continuously metal strip, comprising the following steps performed in sequence:
a) applying a coating to at least one side surface of said strip with a metal coating, said metal coating having a melting temperature substantially below the melting temperature of said strip;
b) conditioning the lateral edges of said strip by removing portions of strip at said lateral edges and forming concave indented surfaces adjacent each of said lateral edges in one surface of said strip;
c) rolling and forming said strip into an open seam annular tube having said concave indented surfaces on an inside lower surface of said open seam tube with said lateral edges nearly abutting in a lower portion of said open seam tube;
d) heating said open seam tube adjacent said lateral edges to a temperature above said metal coating melting temperature and integrally welding said nearly abutting lateral edges to form a seam in said lower portion of said tube, and melting and flowing said metal coating downwardly into said concave indented surfaces and coating said seam.

20. The method of forming a seamed metal tube as defined in claim 19, wherein said method includes forming generally rectangular concave indented surfaces opening through said lateral edges in said one surface of said strip to define said concave indented surfaces, then rolling and forming said strip into an annular tube having nearly abutting lateral edges in a lower portion of said tube with said generally rectangular concave indented surfaces creating and defining a rectangular well in said lower portion of said open seamed tube, then heating and integrally welding said adjacent edges of said strip to form a tube having a welded seam, then reheating at least said lower portion of said tube to said metal coating melting temperature, said metal coating then melting and flowing downwardly into said concave well, coating said seam.

21. The method of forming a seamed metal tube as defined in claim 19, wherein said method includes removing said metal coating from opposed surfaces of said strip adjacent said lateral edges prior to rolling and forming said strip.

22. The method of forming a seamed metal tube as defined in claim 19, wherein said method includes forming chamfered inclined edges on said one surface of said strip at said lateral edges, said chamfered edges defining said concave indented surfaces, then rolling and forming said strip into a generally circular tube having nearly abutting lateral edges in a lower portion of said tube and said chamfered surfaces defining inwardly angled surfaces at said lateral edges, then heating and integrally welding said lateral edges of said strip to form a tube having a welded seam in said lower portion of said tube with said chamfered edges defining inwardly inclined surfaces at said seam, said metal coating melting and flowing downwardly on said inclined surfaces over said seam.

23. The method of forming a seamed metal tube as defined in claim 22, wherein said method includes reheating at least said lower portion of said tube to said metal coating melting temperature following welding of said nearly abutting edges of said strip, said metal coating then melting and flowing downwardly over said inwardly inclined surfaces and coating said seam.

24. A method of forming a seamed metal tube having a metal coating from a continuously relatively flat metal strip, comprising the following steps performed in sequence:
a) applying a coating to at least one side surface of said strip with a metal coating having a melting temperature substantially below the melting temperature of said strip by immersing said strip in a molten metal;
b) removing said metal coating from the lateral edges of said strip and forming depressed surfaces on one surface of said strip at said lateral edges;
c) rolling and forming said strip into an open seam annular tube having said depressed surfaces on an inside lower surface of said open seam tube with said lateral edges nearly abutting in a lower portion of said open seam tube and said depressed surfaces forming an open concave indented surface adjacent said lateral edges;

d) heating said open seamed tube adjacent said lateral edges to a temperature above said metal coating melting temperature and integrally welding said nearly abutting lateral edges, forming a seam in said lower portion of said tube, and then melting and flowing said metal coating downwardly into said concave indented surface and coating said seam.

25. The method of coating a seamed metal tube as defined in claim 24, wherein said method includes removing said metal coating on opposed surfaces of said strip adjacent said lateral edges prior to rolling and forming said strip.

26. The method of forming a seamed metal tube as defined in claim 25, wherein said method includes forming chamfered inclined edges on said one surface of said strip at said lateral edges, then rolling and forming said strip into a generally circular tube having nearly abutting lateral edges in a lower portion of said tube, said chamfered inclined surfaces then defining opposed inwardly inclined surfaces at said nearly abutting lateral edges of said open seamed tube, then heating said open seamed tube adjacent said lateral edges and welding said lateral edges, said metal coating then melting and flowing downwardly over said opposed inwardly inclined surfaces and coating said seam.

27. The method of forming a seamed metal tube as defined in claim 26, wherein said method includes reheating at least said lower portion of said tube to a temperature above said metal coating melting temperature following welding of said lateral edges, said metal coating then melting and flowing downwardly over said opposed inclined surfaces coating said seam.

28. The method of forming a seamed metal tube as defined in claim 24, wherein said method includes forming generally rectangular depressed surfaces on said one surface of said strip opening through said lateral edges, said depressed surfaces forming a generally rectangular well on opposed sides of said seam following welding and said molten metal coating flowing downwardly into said generally rectangular well and coating said seam.

29. The method of forming a seamed metal tube as defined in claim 28, wherein said method includes reheating at least said lower portion of said tube to said metal coating melting temperature following welding, said metal coating then melting and flowing downwardly to said generally rectangular well, coating said tube.

30. A method of forming a seamed metal tube having a metal coating from a continuous metal strip, comprising the following steps performed in sequence:

a) applying a coating to at least one side surface of said strip with a protective metal coating, said metal coating having a melting temperature substantially below the melting temperature of said strip, by immersing said strip in a molten metal;

b) removing said metal coating from the lateral edges of said strip and the opposed surfaces of said strip adjacent said lateral edges and forming depressed surfaces on one surface of said strip at said least lateral edges;

c) rolling and forming said strip into an open seamed annular tube having said depressed surfaces on an inside surface of said open seamed tube with said lateral edges nearly abutting in a lower portion of said open seamed tube and said depressed surfaces forming an open concave indented surface at said lateral edges;

d) heating and integrally welding said lateral edges of said strip to form a tube having a welded seam in said lower portion of said tube with said open concave indented surface on opposed sides of said seam; and e) reheating at least said lower portion of said tube to said metal coating melting temperature, said metal coating then melting and flowing downwardly into said open concave indented surface and coating said seam.

31. The method of forming a seamed metal tube as defined in claim 30, wherein said method includes forming chamfered inclined surfaces on one surface of said strip at said lateral edges, then rolling and forming said strip into a generally circular tube having nearly abutting lateral edges in a lower portion of said tube with said chamfered surfaces defining opposed inwardly inclined surfaces on opposed sides of said seam following welding.

32. The method of forming a seamed metal tube as defined in claim 30, wherein said method includes forming generally rectangular indented surfaces opening through said lateral edges on said one surface of said strip, said generally rectangular surfaces defining a generally rectangular well on opposed sides of said seam following welding, said method including reheating at least said lower portion of said tube, said metal coating then flowing downwardly into said generally rectangular well and coating said seam.

* * * * *

UNITED STATES PATENT AND TRADEMARK OFFICE
CERTIFICATE OF CORRECTION

PATENT NO. : 5,344,062
DATED : September 6, 1994
INVENTOR(S) : Theodore H. Krengel, John J. Borzym, Charles A. Willetts It is certified that error appears in the above-indentified patent and that said Letters Patent is hereby corrected as shown below:

Column 11, line 56, after "said" insert --metal--

Column 13, line 55, delete "continuously" and insert --continuous--

Column 13, line 59, after "a" insert --protective--

Signed and Sealed this

Sixth Day of December, 1994

BRUCE LEHMAN

Attest:

Attesting Officer

Commissioner of Patents and Trademarks